(12) United States Patent
Kim et al.

(10) Patent No.: US 11,614,662 B1
(45) Date of Patent: Mar. 28, 2023

(54) TOUCH DISPLAY DEVICE

(71) Applicant: LG DISPLAY CO., LTD., Seoul (KR)

(72) Inventors: Si-Hyun Kim, Paju-si (KR); Hyun-Ho Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/892,642

(22) Filed: Aug. 22, 2022

(30) Foreign Application Priority Data

Dec. 24, 2021 (KR) ........................ 10-2021-0187595

(51) Int. Cl.
| | | |
|---|---|---|
| *G06F 3/044* | (2006.01) | |
| *G02F 1/1343* | (2006.01) | |
| *G02F 1/1333* | (2006.01) | |
| *G02F 1/1362* | (2006.01) | |
| *G06F 3/041* | (2006.01) | |
| *G02F 1/1368* | (2006.01) | |

(52) U.S. Cl.
CPC ...... *G02F 1/134309* (2013.01); *G02F 1/1368* (2013.01); *G02F 1/13338* (2013.01); *G02F 1/13439* (2013.01); *G02F 1/133357* (2021.01); *G02F 1/136227* (2013.01); *G02F 1/136286* (2013.01); *G06F 3/0412* (2013.01)

(58) Field of Classification Search
CPC .......... G02F 1/133357; G02F 1/13338; G02F 1/13439; G06F 3/044
See application file for complete search history.

(56) References Cited

U.S. PATENT DOCUMENTS

| | | | | |
|---|---|---|---|---|
| 2018/0150167 A1* | 5/2018 | Hong | ................. | G06F 3/0412 |
| 2018/0204853 A1* | 7/2018 | Saitoh | ................. | G06F 3/0412 |
| 2020/0073499 A1* | 3/2020 | Chi | ................. | G06F 3/04166 |

FOREIGN PATENT DOCUMENTS

| | | | |
|---|---|---|---|
| KR | 10-2017-0051789 A | 5/2017 | |
| KR | 10-2017-0065881 A | 6/2017 | |

* cited by examiner

*Primary Examiner* — Sanghyuk Park
(74) *Attorney, Agent, or Firm* — Morgan, Lewis & Bockius LLP

(57) ABSTRACT

A touch display device includes a substrate; a thin film transistor over the substrate; a planarization layer over the thin film transistor; a touch line over the planarization layer; a touch insulation layer over the touch line; a touch electrode over the touch insulation layer; a pixel electrode over the touch electrode and connected to the thin film transistor, wherein the planarization layer has a first hole corresponding to a drain electrode of the thin film transistor, and the touch insulation layer has a second hole corresponding to the drain electrode, and wherein the second hole includes a first hole portion and a second hole portion connected to each other along a first direction, the first hole is disposed within the first hole portion, and the touch electrode is in contact with the touch line through the second hole portion.

12 Claims, 8 Drawing Sheets

TOUCH DISPLAY DEVICE

CROSS-REFERENCE TO RELATED APPLICATION

The present application claims the priority of Korean Patent Application No. 10-2021-0187595 filed on Dec. 24, 2021, which is hereby incorporated by reference in its entirety.

BACKGROUND

Technical Field

The present disclosure relates to a display device, and more particularly, to a touch display device having a touch screen.

Discussion of the Related Art

As the information society is in progress, a demand for display devices of displaying images increases in various forms, and flat panel display devices (FPD) such as liquid crystal display devices (LCD) and organic light emitting diode display devices (OLED) have been developed and applied to various fields.

Among the flat panel display devices, liquid crystal display devices have been widely used because of their compact size, light weight, thin thickness, low power driving, and the like.

The liquid crystal display devices use optical anisotropy and dielectric anisotropy of liquid crystal and include two substrates, a liquid crystal layer between the two substrates, and a pixel electrode and a common electrode for driving liquid crystal molecules of the liquid crystal layer. The liquid crystal display devices control the arrangement of the liquid crystal molecules by an electric field generated by applying a voltage to the pixel electrode and the common electrode and display images by the light transmittance changed accordingly. The liquid crystal display devices have been widely applied to portable devices such as cellphones or multimedia devices, monitors for notebooks or computers, and large televisions.

Recently, touch display devices, which include a touch panel attached on a display panel of such liquid crystal display devices, have been spotlighted.

The touch display devices are used as an output means for displaying images and also used as an input means for receiving instructions from a user by touching a specific location of a displayed image. Touch panels of the touch display devices are classified into various types according to different methods of detecting the location information, including resistive type, capacitive type, infrared type, and surface acoustic wave type.

Namely, when a user touches the touch panel while watching an image displayed by the display panel, the touch panel detects location information about the touch point and compares the detected location information with location information of the image, thereby performing an instruction from the user.

The touch display device may be manufactured by attaching a separate touch panel to the display panel or integrally forming a touch panel on a substrate of the display panel.

Particularly, to make a portable terminal, such as a smartphone and a tablet personal computer (PC), slim, a demand is increasing for an in-cell type touch display device in which touch electrodes and touch lines included in the touch panel are integrally formed on a substrate of a display panel.

Meanwhile, a high-definition touch display device is required to realize a clearer image quality, and accordingly, the size of a pixel is reduced to have a larger number of pixels in the same area.

However, in the in-cell type touch display device, since the touch lines are further provided on the substrate of the display panel and contact portions for connecting the touch lines and the touch electrodes are further needed, there are restrictions on reducing the size of the pixel. Accordingly, there is a limit to the increase in resolution.

SUMMARY

Accordingly, embodiments of the present disclosure are directed to a touch display device that substantially obviates one or more of the problems due to limitations and disadvantages of the related art.

An aspect of the present disclosure is to provide a touch display device capable of improving the resolution.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a touch display device comprises a substrate; a thin film transistor over the substrate; a planarization layer over the thin film transistor; a touch line over the planarization layer; a touch insulation layer over the touch line; a touch electrode over the touch insulation layer; a pixel electrode over the touch electrode and connected to the thin film transistor, wherein the planarization layer has a first hole corresponding to a drain electrode of the thin film transistor, and the touch insulation layer has a second hole corresponding to the drain electrode, and wherein the second hole includes a first hole portion and a second hole portion connected to each other along a first direction, the first hole is disposed within the first hole portion, and the touch electrode is in contact with the touch line through the second hole portion.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the present disclosure and which are incorporated in and constitute a part of this application, illustrate aspects of the disclosure and together with the description serve to explain various principles of the present disclosure. In the drawings.

DETAILED DESCRIPTION

Reference will now be made in detail to aspects of the disclosure, example embodiments of which is illustrated in the accompanying drawings.

Figure 1:
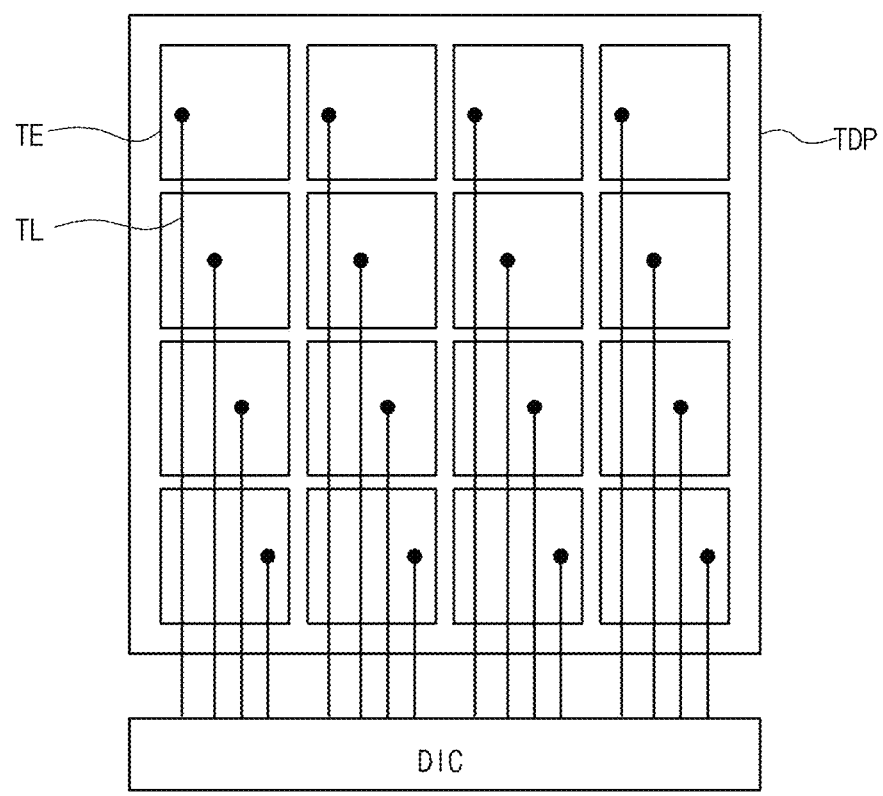
FIG. 1 is a schematic view of a touch display device according to an embodiment of the present disclosure.

FIG. 1 is a schematic view of a touch display device according to an embodiment of the present disclosure.

In FIG. 1, the touch display device according to the embodiment of the present disclosure includes a touch display panel TDP and a touch display driving part DIC.

The touch display panel TDP displays an image and senses a touch. The touch display panel TDP includes a plurality of touch electrodes TE and a plurality of touch lines TL for sensing the touch.

The plurality of touch electrodes TE is divided into sensing blocks, and the plurality of touch lines TL is connected to the plurality of touch electrodes TE, respectively, thereby connecting the plurality of touch electrodes TE with the touch display driving part DIC. For example, the plurality of touch electrodes TE may be arranged in a matrix form. The number of touch electrodes TE is not limited as being illustrated and may be changed.

The touch display panel TDP may be a liquid crystal panel. The touch display panel TDP may include a first substrate, a second substrate, and a liquid crystal layer interposed therebetween to display an image. A plurality of gate lines, a plurality of data lines, a plurality of thin film transistors, a plurality of pixel electrodes, and a common electrode may be provided on the first substrate, and a color filter layer and a black matrix may be provided on the second substrate.

Here, the common electrode may be used as the touch electrodes TE.

The touch display driving part DIC provides the touch display panel TDP with signals for displaying an image and sensing a touch.

For example, during a display period for displaying an image, the touch display driving part DIC supplies a gate voltage and a data voltage to the gate line and the data line of the touch display panel TDP, respectively, and provides a common voltage to the touch electrodes TE through the touch lines TL of the touch display panel TDP.

Accordingly, the touch display device displays an image using the gate voltage and the data voltage.

In addition, during a touch period for detecting a touch, the touch display driving part DIC supplies touch voltages to the touch electrodes TE through the touch lines TL of the touch display panel TDP.

Accordingly, the touch display device detects the touch by analyzing a change in the touch voltages.

A configuration of a subpixel of the touch display device will be described in detail with reference to FIG. 2 and FIG. 3.

Figure 2:
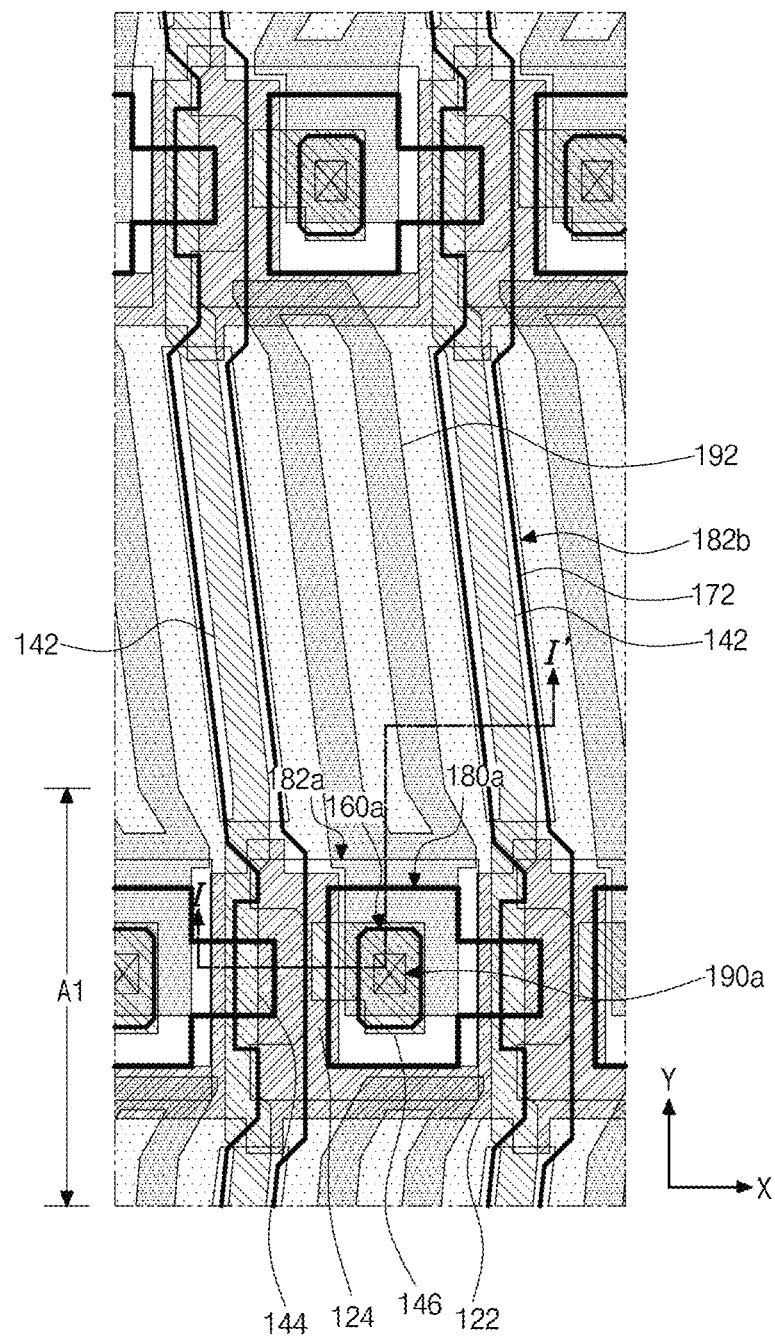
FIG. 2 is a schematic plan view of a touch display device according to an embodiment of the present disclosure.
Figure 3:
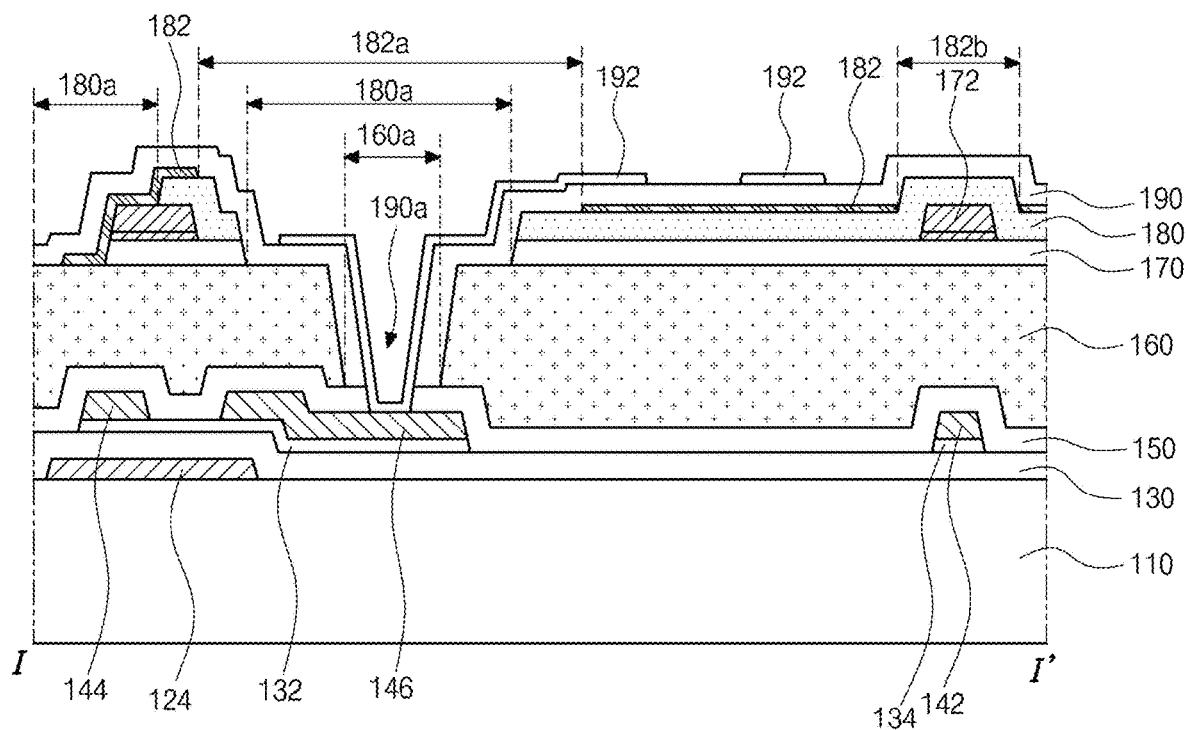
FIG. 3 is a cross-sectional view taken along the line I-I' of FIG. 2.

FIG. 2 is a schematic plan view of a touch display device according to an embodiment of the present disclosure, and FIG. 3 is a cross-sectional view taken along the line I-I' of FIG. 2. FIG. 2 and FIG. 3 show one subpixel.

In FIG. 2 and FIG. 3, a gate line 122 and a gate electrode 124 of a conductive material are formed on a transparent insulation substrate 110. The substrate 110 may be formed of glass or plastic.

The gate line 122 extends in an X direction, that is, a first direction, and the gate electrode 124 is connected to the gate line 122. The gate electrode 124 extends from the gate line 122 in a Y direction, that is, a second direction. Alternatively, the gate electrode 124 may be a portion of the gate line 122, and in this case, the gate electrode 124 may have a wider width than other parts of the gate line 122.

The gate line 122 and the gate electrode 124 may be formed of aluminum (Al), molybdenum (Mo), nickel (Ni), chromium (Cr), copper (Cu), neodymium (Nd), titanium (Ti), or their alloys and may have a single-layered structure or a multiple-layered structure.

A gate insulation layer 130 is formed on the gate line 122 and the gate electrode 124 and covers the gate line 122 and the gate electrode 124. The gate insulation layer 130 may be formed over substantially an entire surface of the substrate 110 and may be formed of silicon nitride (SiNx) or silicon oxide ($SiO_2$).

A semiconductor layer 132 is formed on the gate insulation layer 130 over the gate electrode 124. The semiconductor layer 132 may be formed of oxide semiconductor. In this case, an etch stopper may be further formed on the semiconductor layer 132 to correspond to the gate electrode 124.

Alternatively, the semiconductor layer 132 may be formed of amorphous silicon. In this case, the semiconductor layer 132 may include an active layer of intrinsic amorphous silicon and an ohmic contact layer of impurity-doped amorphous silicon on the active layer, and the ohmic contact layer may be divided into two parts, thereby exposing a top surface of the active layer.

In addition, a semiconductor pattern 134 is formed on the gate insulation layer 130 and formed of the same material as the semiconductor layer 132.

Next, source and drain electrodes 144 and 146 of a conductive material are formed on the semiconductor layer 132. The source and drain electrodes 144 and 146 are spaced apart from each other over the semiconductor layer 132 with respect to the gate electrode 124, and the semiconductor layer 132 between the source and drain electrodes 144 and 146 is exposed.

Here, both side surfaces of the source electrode 144 facing each other along the first direction may be disposed right over the gate electrode 124. Alternatively, only one side surface of the source electrode 144 adjacent to the drain electrode 146 may be disposed right over the gate electrode 124 such that the source electrode 144 partially overlaps the gate electrode 124.

Further, a data line 142 is formed on the semiconductor pattern 134 and formed of the same material as the source and drain electrodes 144 and 146. The data line 142 extends substantially in the second direction and crosses the gate line 122 to thereby define a subpixel. The data line 142 is connected to the source electrode 144, and the source electrode 144 may be a portion of the data line 142. Alternatively, the source electrode 144 may extend from the data line 142 along the first direction.

The source and drain electrodes 144 and 146 and the data line 142 may be formed of aluminum (Al), molybdenum (Mo), nickel (Ni), chromium (Cr), copper (Cu), neodymium (Nd), titanium (Ti), or their alloys and may have a single-layered structure or a multiple-layered structure.

The gate electrode 124, the semiconductor layer 132, the source electrode 144, and the drain electrode 146 constitute a thin film transistor, and a portion of the semiconductor layer 132 exposed between the source and drain electrodes 144 and 146 becomes a channel of the thin film transistor.

Here, the semiconductor layer 132, the source and drain electrodes 144 and 146, and the data line 142 may be formed through a photolithography process using one mask. Accordingly, the semiconductor layer 132 has substantially the same shape as the source and drain electrodes 144 and 146 except for the portion between the source and drain electrodes 144 and 146. At this time, the semiconductor pattern 134 is formed together, and the semiconductor pattern 134 has the same shape as the data line 142.

Alternatively, the semiconductor layer 132, the source and drain electrodes 144 and 146, and the data line 142 may be formed through two photolithography processes using two masks. In this case, side surfaces of the semiconductor layer 132 can be covered by the source and drain electrodes 144 and 146, and the semiconductor pattern 134 under the data line 142 can be omitted.

Next, a protective layer 150 of an insulating material is formed on the source and drain electrodes 144 and 146. The protective layer 150 may be formed over substantially the entire surface of the substrate 110 and may be formed of an inorganic insulating material such as silicon nitride (SiNx) or silicon oxide ($SiO_2$). However, the present disclosure is not limited thereto. The protective layer 150 may be omitted.

A planarization layer 160 of an insulating material is formed on the protective layer 150. The planarization layer 160 may be formed over substantially the entire surface of the substrate 110 and may be formed of an organic insulating material. For example, the planarization layer 160 may be formed of photo acryl having a photosensitive property. Alternatively, the planarization layer 160 may be formed of benzocyclobutene (BCB), polyimide (PI), or polyamide (PA), but is not limited thereto.

The planarization layer 160 has a flat top surface and removes step differences due to underlying layers. A thickness of the planarization layer 160 is thicker than those of the underlying layers. Specifically, the planarization layer 160 has a thicker thickness than the protective layer 150.

Meanwhile, the planarization layer 160 has a first hole 160a corresponding to a portion of the drain electrode 146. Accordingly, a top surface of the protective layer 150 is exposed through the first hole 160a.

A buffer layer 170 of an insulating material is formed on the planarization layer 160. The buffer layer 170 may be formed over substantially the entire surface of the substrate 110 and may be formed of an inorganic insulating material such as silicon nitride (SiNx) or silicon oxide ($SiO_2$). The buffer layer 170 may be omitted.

A touch line 172 of a conductive material is formed on the buffer layer 170. The touch line 172 extends substantially in the second direction. The touch line 172 crosses the gate line 122 and overlaps the data line 142. The touch line 172 has a wider width than the data line 142, and both side surfaces of the data line 142 are disposed between both side surfaces of the touch line 172.

The touch line 172 may be formed of aluminum (Al), molybdenum (Mo), nickel (Ni), chromium (Cr), copper (Cu), neodymium (Nd), titanium (Ti), or their alloys. For example, the touch line 172 may have a double-layered structure of molybdenum titanium (MoTi) and copper (Cu). However, the present disclosure is not limited thereto. Alternatively, the touch line 172 may have a single-layered structure or a triple-layered structure.

A touch insulation layer 180 of an insulating material is formed on the touch line 172. The touch insulation layer 180 may be formed over substantially the entire surface of the substrate 110 and may be formed of an inorganic insulating material such as silicon nitride (SiNx) or silicon oxide ($SiO_2$). However, the present disclosure is not limited thereto.

The touch insulation layer 180 has a second hole 180a corresponding to the first hole 160a, and the first hole 160a is disposed within the second hole 180a. Accordingly, the top surface of the planarization layer 160 is exposed through the second hole 180a. In addition, the second hole 180a exposes a portion of the touch line 172. The second hole 180a is also formed in the buffer layer 170.

A touch electrode 182 of a conductive material is formed on the touch insulation layer 180. The touch electrode 182 is patterned for each sensing block. The touch electrode 182 may be formed of a transparent conductive material such as indium tin oxide (ITO) or indium zinc oxide (IZO).

The touch electrode 182 has a first opening 182a corresponding to the second hole 180a. The first opening 182a partially overlaps the second hole 180a, and the touch electrode 182 contacts the touch line 172 through the second hole 180a. The second hole 180a and the first opening 182a will be described in detail later.

Further, the touch electrode 182 has a second opening 182b corresponding to the touch line 172. The second opening 182b extends substantially in the second direction, and the second opening 182b has a length along the second direction longer than a length along the first direction. The second opening 182b is disposed between adjacent two gate lines 122 and exposes a top surface of the touch insulation layer 180 on the touch line 172. A width of the second opening 182b is wider than the width of the touch line 172, and the both side surfaces of the touch line 172 are disposed within the second opening 182b.

A passivation layer 190 of an insulating material is formed on the touch electrode 182. The passivation layer 190 may be formed over substantially the entire surface of the substrate 110 and may be formed of an inorganic insulating material such as silicon nitride (SiNx) or silicon oxide ($SiO_2$). However, the present disclosure is not limited thereto.

The passivation layer 190 contacts side surfaces of the planarization layer 160 and has a drain contact hole 190a exposing the drain electrode 146. In this case, the drain contact hole 190a is also formed in the protective layer 150, and the drain contact hole 190a is disposed within the first hole 160a.

A pixel electrode 192 of a conductive material is formed on the passivation layer 190. The pixel electrode 192 may be formed of a transparent conductive material such as indium tin oxide (ITO) or indium zinc oxide (IZO).

The pixel electrode 192 is in contact with the drain electrode 146 through the drain contact hole 190a in the first hole 160a.

In the present disclosure, the drain contact hole 190a and the first hole 160a are described as being separately provided, but is not limited thereto. Alternatively, the drain contact hole 190a and the first hole 160a may be one. That is, one contact hole exposing the drain contact hole 146 may be provided in the passivation layer 190, the planarization layer 160, and the protective layer 150, and in this case, the pixel electrode 192 may be in contact with the side surface of the planarization layer 160.

The pixel electrode 192 is provided at each subpixel. The pixel electrode 192 may be disposed between adjacent data lines 142 and may overlap a previous gate line 122 corresponding to a subpixel of a previous row.

The pixel electrode 192 includes a plurality of patterns extending substantially in the second direction and spaced apart from each other in the first direction. The plurality of patterns of the pixel electrode 192 may be connected to each other at both ends thereof and may be inclined with a predetermined angle with respect to the second direction. In this case, the data line 142 and the touch line 172 may also be inclined with the predetermined angle with respect to the second direction, and the plurality of patterns of the pixel electrode 192 may be substantially parallel to the data line 142 and the touch line 172.

The plurality of patterns of the pixel electrode 192 overlaps the touch electrode 182, and an electric field substantially parallel to the substrate 110 is generated between the plurality of patterns of the pixel electrode 192 and the touch electrode 182 when a voltage is applied. The touch electrode 182 serves as a common electrode for driving liquid crystal molecules during a display period when an image is displayed.

As described above, in the embodiment of the present disclosure, the touch insulation layer 180 has the second hole 180a, and the touch electrode 182 is in contact with the touch line 172 through the second hole 180a. At this time, the second hole 180a may include a portion corresponding to the first hole 160a and a portion corresponding to the touch line 172. Accordingly, an area for the second hole 180a is reduced, thereby increasing the resolution. This will be described in detail with reference to accompanying drawings.

Figure 4:
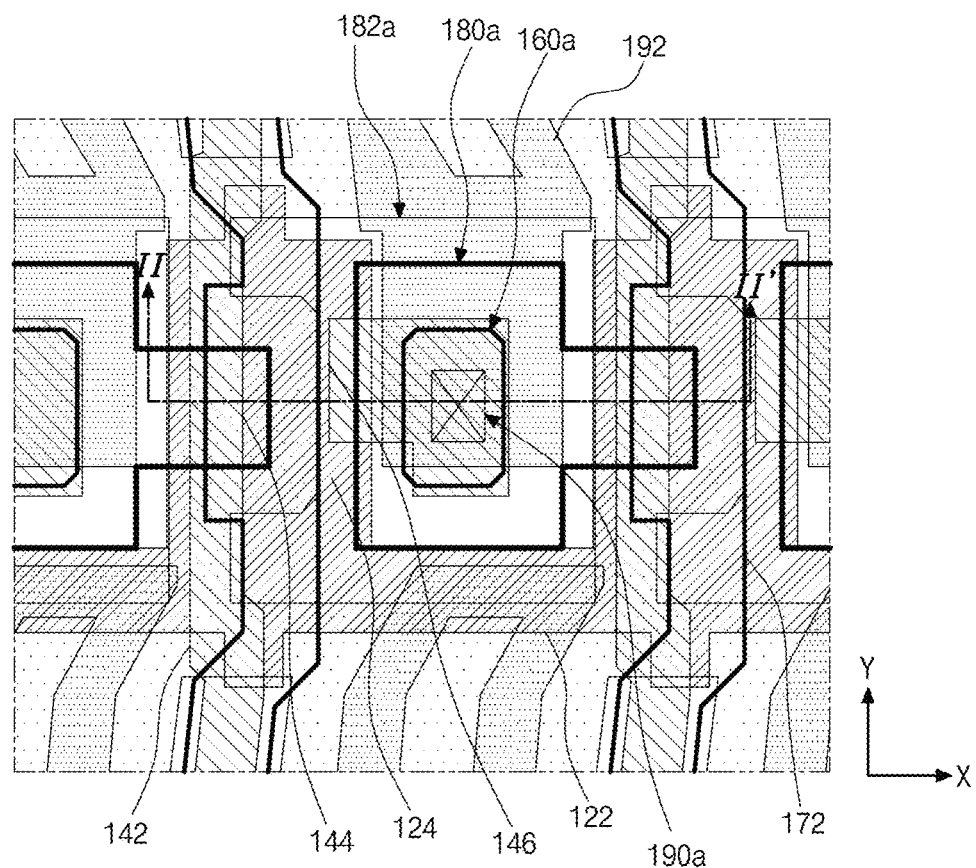
FIG. 4 is an enlarged plan view of the region A1 of FIG. 2.
Figure 5:
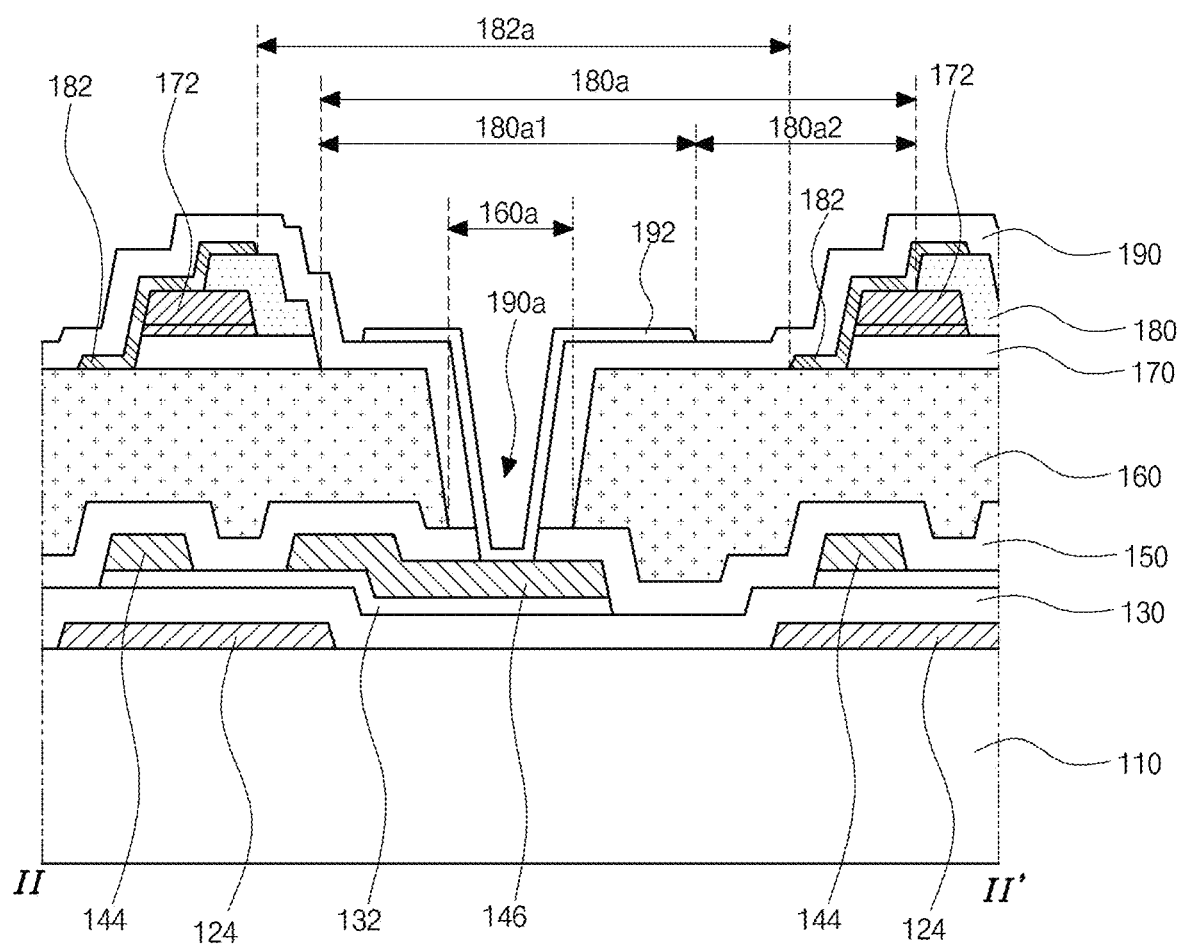
FIG. 5 is a cross-sectional view taken along the line II-II' of FIG. 4.
Figure 6:
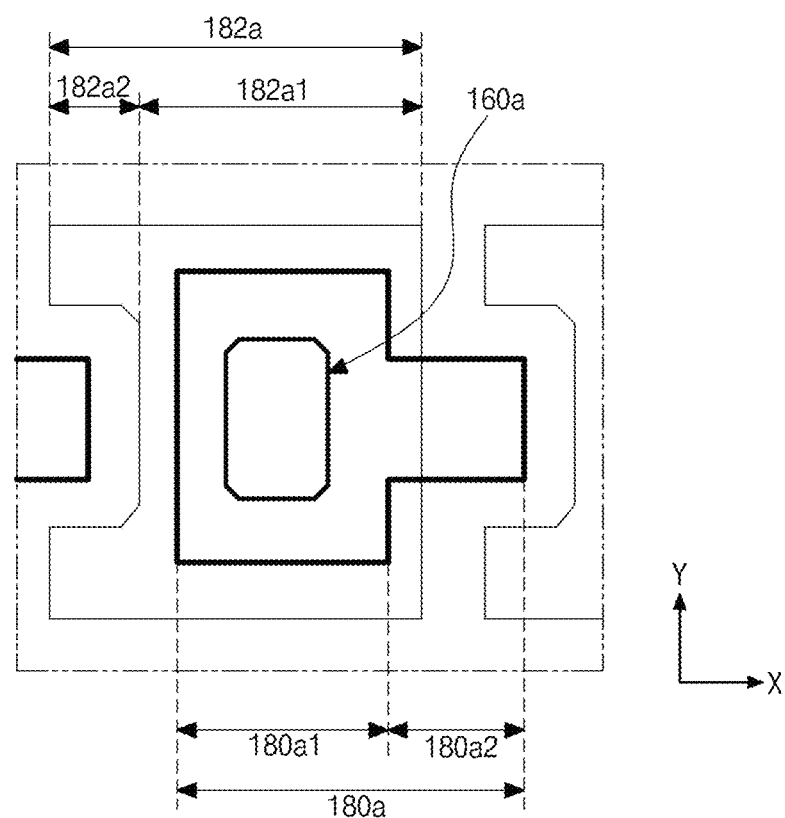
FIG. 6 is a view schematically illustrating the first hole, the second hole, and the first opening according to the embodiment of the present disclosure.

FIG. 4 is an enlarged plan view of the region A1 of FIG. 2, FIG. 5 is a cross-sectional view taken along the line II-IF of FIG. 4, and FIG. 6 is a view schematically illustrating the first hole, the second hole, and the first opening according to the embodiment of the present disclosure.

In FIG. 4, FIG. 5, and FIG. 6, the planarization layer 160 has the first hole 160a exposing the top surface of the protective layer 150 to correspond to the portion of the drain electrode 146.

The buffer layer 170 and the touch line 172 are sequentially formed on the planarization layer 160, and the touch insulation layer 180 on the touch line 172 has the second hole 180a. The second hole 180a is also formed in the buffer layer 170, and side surfaces of the buffer layer 170 are exposed. In addition, the top surface of the planarization layer 160 is exposed through the second hole 180a, and the top surface of the protective layer 150 is also exposed through the second hole 180a.

The second hole 180a includes a first hole portion 180a1 corresponding to the first hole 160a and a second hole portion 180a2 corresponding to the touch line 172. The first hole portion 180a1 and the second hole portion 180a2 are disposed in the first direction and connected to each other to form one body.

The first hole 160a is disposed in the first hole portion 180a1, and the second hole portion 180a2 exposes the portion of the touch line 172. Specifically, the second hole portion 180a2 exposes the side surface and a portion of a top surface of the touch line 172. An area of the first hole portion 180a1 is larger than an area of the second hole portion 180a2.

The touch electrode 182 on the touch insulation layer 180 having the second hole 180a is in contact with the touch line 172 through the second hole portion 180a2. Specifically, the touch electrode 182 is in contact with the side surface and the portion of the top surface of the touch line 172. Here, it is beneficial that the touch electrode 182 substantially fully covers the top surface of the touch line 172. That is, an edge of the touch electrode 182 is not disposed on the top surface of the touch line 172.

Further, the touch electrode 182 is also in contact with the side surface of the buffer layer 170 and the top surface of the planarization layer 160.

The touch electrode 182 has the first opening 182a corresponding to the second hole 180a, The first opening 182a includes a first opening portion 182a1 corresponding to the first hole portion 180a1 and a pair of second opening portions 182a2 corresponding to the second hole portion 180a2.

The first opening portion 182a1 has a larger area than the first hole portion 180a1, and the first hole portion 180a1 is disposed in the first opening portion 182a1. The pair of second opening portions 182a2 extends from upper and lower ends of the first opening portion 182a1 in the first direction, respectively. A second hole portion 180a2 of a second hole 180a of a subpixel adjacent to the corresponding subpixel is disposed between the pair of second opening portions 182a2. Accordingly, the second hole portion 180a2 of the second hole 180a of the corresponding subpixel is disposed between a pair of second opening portions 182a2 of a first opening 182a of another subpixel adjacent to the corresponding subpixel.

The top surface of the planarization layer 160 and the top surface of the protective layer 150 are exposed through the first opening 182a. In addition, the top surface and side surfaces of the touch insulation layer 180 are exposed through the first opening 182a, and the side surfaces of the buffer layer 170 are also exposed through the first opening 182a.

The passivation layer 190 on the touch electrode 182 is in contact with the top surface and the side surfaces of the planarization layer 160 exposed through the second hole 180a and also in contact with the top surface of the protective layer 150. Further, the passivation layer 190 is in contact with the top surface and the side surface of the touch insulation layer 180 and also in contact with the side surface of the buffer layer 170.

The passivation layer 190 has the drain contact hole 190a exposing the drain electrode 146. The drain contact hole 190a is also formed in the passivation layer 150. The drain contact hole 190 is disposed within the first hole 160a, and thus is also disposed within the first hole portion 180a1 of the second hole 180a.

Meanwhile, as described above, the drain contact hole 190a and the first hole 160a may be provided as one contact hole exposing the drain electrode 146, and the one contact hole may be disposed within the first hole portion 180a1 of the second hole 180a.

As such, in the touch display device according to the embodiment of the present disclosure, the second hole 180a of the touch insulation layer 180 includes the first hole portion 180a1, which corresponds to the first hole 160a and the drain contact hole 190a for contacting the pixel electrode 192 and the drain electrode 146, and the second hole portion 180a2, which is to contact the touch electrode 182 and the touch line 172. The first hole portion 180a1 and the second hole portion 180a2 are connected to each other to form one body.

Accordingly, a pixel pitch can be reduced, so that an ultra-high definition (UHD) touch display device having a resolution of 300 ppi or more can be implemented.

Figure 7:
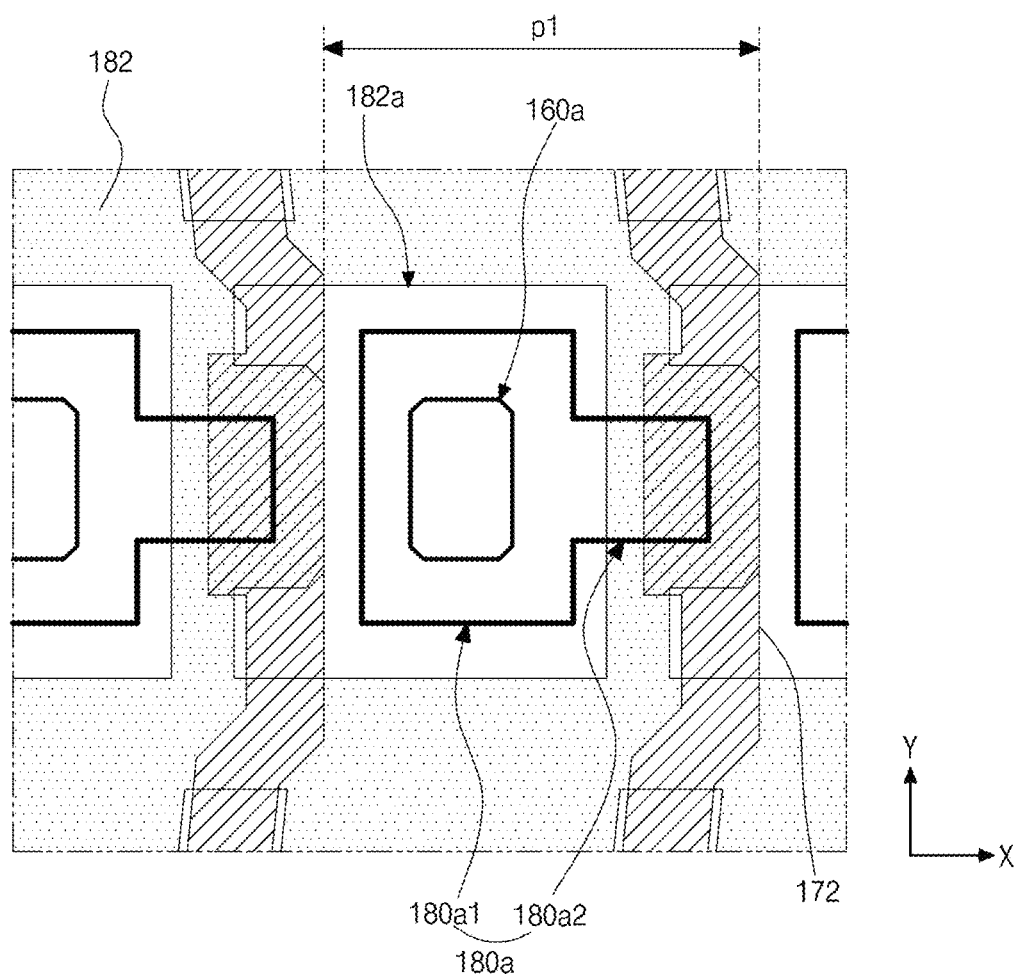
FIG. 7 is a view schematically illustrating a pixel pitch of the touch display device according to the embodiment of the present disclosure.
Figure 8:
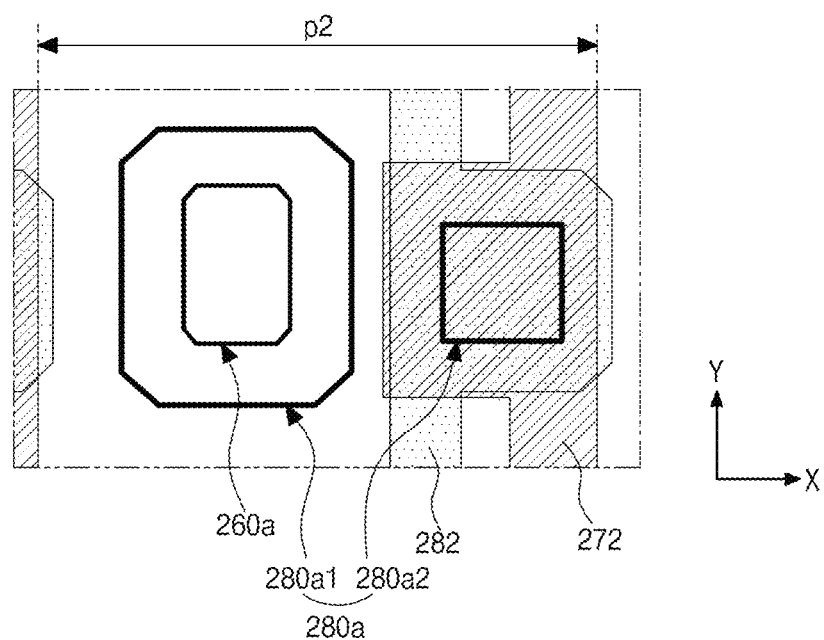
FIG. 8 is a view schematically illustrating a pixel pitch of a touch display device according to a comparative embodiment.

FIG. 7 is a view schematically illustrating a pixel pitch of the touch display device according to the embodiment of the present disclosure, and FIG. 8 is a view schematically illustrating a pixel pitch of a touch display device according to a comparative embodiment. FIG. 4 and FIG. 5 will be referenced together.

As shown in FIG. 7, in the touch display device according to the embodiment of the present disclosure, the second hole 180a provided in the touch insulation layer 180 includes the first hole portion 180a1 corresponding to the first hole 160a of the planarization layer 160 and the second hole portion 180a2 corresponding to the touch electrode 182. The first hole portion 180a1 and the second hole portion 180a2 are disposed along the first direction and connected to each other.

Accordingly, a length of the first direction corresponding to the second hole 180a can be reduced, and thus, the area for the second hole 180a can be decreased.

The touch display device according to the embodiment of the present disclosure has a first pitch p1 along the first direction. The first pitch p1 may be defined as a distance between surface sides of two adjacent touch lines 172, that is, a distance from one side surface of a touch line 172 to one side surface of another touch line 172 adjacent thereto.

On the other hand, as shown in FIG. 8, in the touch display device according to the comparative embodiment, the second hole 280a provided in the touch insulation layer includes the first hole portion 280a1 corresponding to the first hole 260a of the planarization layer and the second hole portion 280a2 corresponding to the touch electrode 282 and the touch line 272. Here, the first hole portion 280a1 and the second hole portion 280a2 are disposed in the first direction and spaced apart from each other.

The touch display device according to the comparative embodiment has a second pitch p2 along the first direction, and the second pitch p2 is greater than the first pitch p1.

In the touch display device according to the comparative embodiment, since the second hole portion 280a2 exposes the top surface of the touch line 272 and the touch electrode 282 is in contact with the top surface of the touch line 272 exposed through the second hole portion 280a2, to do this, the area of the touch line 272 and the touch electrode 282 overlapping each other should be larger than the area of the second hole portion 280a2. In addition, to prevent a short circuit with the pixel electrode, the touch line 272 and the touch electrode 282 overlapping each other should be spaced apart from the first hole portion 280a1.

Accordingly, the second pitch p2 must be greater than the first pitch p1. For example, the first pitch p1 may be 25 µm and the second pitch p2 may be 32 but is not limited thereto.

Meanwhile, to reduce the second pitch p2, if the first hole portion 280a1 and the second hole portion 280a2 are disposed in the second direction, a width of a black matrix for shielding the first hole portion 280a1 and the second hole portion 280a2 will be increased, thereby lowering the transmittance.

As such, in the embodiment of the present disclosure, the second hole 180a of the touch insulation layer 180 includes the first hole portion 180a1 and the second hole portion 180a2 formed as one body, so that the pixel pitch can be minimized, thereby implementing an UHD touch display device.

Since the first hole portion 180a1 and the second hole portion 180a2 of the second hole 180a are disposed in the first direction, it is possible to attain the higher transmittance as compared to the case in which the first and second hole portions are disposed in the second direction.

In addition, the touch electrode 182 is in contact with the top surface and the side surface of the touch line 172 through the second hole portion 180a2. Accordingly, the overlapping area of the touch electrode 182 and the touch line 172 can be reduced, and the parasitic capacitance can be reduced, thereby decreasing the touch load.

In the present disclosure, the common electrode is used as the touch electrode, so that the thickness of the touch display device can be reduced.

Additionally, since the first hole portion of the touch insulation layer for contacting the pixel electrode and the drain electrode and the second hole portion of the touch insulation layer for contacting the touch electrode and the touch line are configured to form one body, the pixel pitch can be reduced without the decrease in the transmittance, thereby implementing the UHD touch display device.

Further, the overlapping area of the touch electrode and the touch line is reduced, so that the touch load can be decreased.

It will be apparent to those skilled in the art that various modifications and variations can be made in the touch display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
   a substrate;
   a thin film transistor over the substrate;
   a planarization layer over the thin film transistor;
   a touch line over the planarization layer;
   a touch insulation layer over the touch line;
   a touch electrode over the touch insulation layer;
   a pixel electrode over the touch electrode and connected to the thin film transistor,
   wherein the planarization layer has a first hole corresponding to a drain electrode of the thin film transistor, and the touch insulation layer has a second hole corresponding to the drain electrode, and
   wherein the second hole includes a first hole portion and a second hole portion connected to each other along a first direction, the first hole is disposed within the first hole portion, and the touch electrode is in contact with the touch line through the second hole portion.

2. The touch display device of claim 1, wherein the touch electrode is in contact with a top surface and a side surface of the touch line.

3. The touch display device of claim 2, wherein the touch electrode is in contact with a top surface of the planarization layer through the second hole portion.

4. The touch display device of claim 1, wherein an area of the first hole portion is larger than an area of the second hole portion.

5. The touch display device of claim 1, wherein the touch electrode includes a first opening corresponding to the second hole, and
   wherein the first opening includes a first opening portion and a pair of second opening portions connected to each other along the first direction, and the pair of second opening portions extends from upper and lower ends of the first opening portion in the first direction.

6. The touch display device of claim 5, wherein the first hole portion is disposed within the first opening portion, and the second hole portion is disposed between a pair of second opening portions of another first opening adjacent to the first opening.

7. The touch display device of claim 5, further comprising a gate line and a data line connected to the thin film transistor,
  wherein the touch electrode further includes a second opening corresponding to the touch line between adjacent gate lines.

8. The touch display device of claim 7, wherein the first direction is a direction that the gate line extends.

9. The touch display device of claim 5, wherein a top surface of the planarization layer and a top surface and side surfaces of the touch insulation layer are exposed through the first opening.

10. The touch display device of claim 1, further comprising a passivation layer between the touch electrode and the pixel electrode,
  wherein the passivation layer has a drain contact hole exposing the drain electrode, and the drain contact hole is disposed within the first hole.

11. The touch display device of claim 10, wherein the passivation layer is in contact with a side surface of the planarization layer.

12. The touch display device of claim 10, wherein the drain contact hole is the first hole.

* * * * *